(12) United States Patent
Yokokawa et al.

(10) Patent No.: US 9,800,315 B2
(45) Date of Patent: Oct. 24, 2017

(54) RECEPTION APPARATUS, RECEPTION METHOD, AND PROGRAM

(71) Applicant: SONY CORPORATION, Tokyo (JP)

(72) Inventors: Takashi Yokokawa, Kanagawa (JP); Satoshi Okada, Tokyo (JP); Hirofumi Maruyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/022,608

(22) PCT Filed: Sep. 29, 2014

(86) PCT No.: PCT/JP2014/075798
§ 371 (c)(1),
(2) Date: Mar. 17, 2016

(87) PCT Pub. No.: WO2015/053110
PCT Pub. Date: Apr. 16, 2015

(65) Prior Publication Data
US 2016/0233943 A1     Aug. 11, 2016

(30) Foreign Application Priority Data

Oct. 10, 2013   (JP) .................................. 2013-212817

(51) Int. Cl.
*H04B 7/08*     (2006.01)
*H04L 1/02*     (2006.01)
(Continued)

(52) U.S. Cl.
CPC ............. *H04B 7/0837* (2013.01); *H04B 7/08* (2013.01); *H04L 1/02* (2013.01); *H04L 27/2662* (2013.01); *H04L 27/2666* (2013.01); *H04B 7/02* (2013.01)

(58) Field of Classification Search
CPC .......... H04B 7/08; H04B 7/0837; H04B 7/02; H04B 7/0845; H04L 27/2666; H04L 1/02
See application file for complete search history.

(56) References Cited

U.S. PATENT DOCUMENTS 6,532,252 B1 * 3/2003 Moon .................... H04B 7/005
370/252
7,965,762 B2 * 6/2011 Grilli ........................ G01S 5/10
375/136
(Continued)

FOREIGN PATENT DOCUMENTS

JP    2001-203666    7/2001
JP    2010-268224    11/2010
JP    2013-135270    7/2013

*Primary Examiner* — Jean B Corrielus
(74) *Attorney, Agent, or Firm* — Chip Law Group

(57) ABSTRACT

The present technology relates to a reception apparatus, a reception method, and a program capable of improving performance in diversity. The reception apparatus includes a plurality of demodulation units configured to demodulate a supplied branch and generate a symbol and a synthesis unit configured to synthesize the symbol demodulated by the plurality of demodulation units, in which the synthesis unit sets a predetermined time from arrival time of a first-arriving symbol as a search range, and synthesizes a symbol that arrives within the search range and the first-arriving symbol. The present technology can be applied to a mobile terminal apparatus that receives television broadcasting or the like with diversity system.

6 Claims, 7 Drawing Sheets

(51) Int. Cl.
　　　*H04L 27/26*　　　(2006.01)
　　　*H04B 7/02*　　　(2017.01)

(56) References Cited

U.S. PATENT DOCUMENTS

| | | | | |
|---|---|---|---|---|
| 8,290,441 | B2* | 10/2012 | Kurapati | H04L 25/0212 370/208 |
| 2003/0031234 | A1* | 2/2003 | Smee | H04B 7/0848 375/147 |
| 2004/0102961 | A1* | 5/2004 | Jensen | H04H 20/31 704/201 |
| 2006/0293006 | A1* | 12/2006 | Taniguchi | H04B 7/0817 455/132 |
| 2007/0142009 | A1* | 6/2007 | Scarpa | H04B 7/0868 455/132 |
| 2007/0248191 | A1* | 10/2007 | Pettersson | H04B 1/707 375/340 |
| 2010/0183100 | A1* | 7/2010 | Shimezawa | H04B 1/7115 375/340 |
| 2010/0246637 | A1* | 9/2010 | Miyatani | H04J 11/0063 375/130 |
| 2013/0115903 | A1* | 5/2013 | Kroeger | H04B 7/0845 455/193.1 |

* cited by examiner

RECEPTION APPARATUS, RECEPTION METHOD, AND PROGRAM

TECHNICAL FIELD

The present disclosure relates to a reception apparatus, a reception method, and a program. Specifically, the present disclosure relates to a reception apparatus, a reception method, and a program appropriate to improve performance in reception using diversity.

BACKGROUND ART

Some image display apparatuses having displays such as televisions and mobile terminal apparatuses are provided with reception apparatuses each having a plurality of antennas (see, for example, Patent Document 1).

Existing technologies pursue improvement of quality and reliability of communication for signals that are identical to those received through a plurality of antennas, by primarily using signals received via an antenna having an optimal radio wave condition, by removing noise upon synthesizing the received signal, and the like. This kind of technology is called diversity.

Patent Document 1: Japanese Patent Application Laid-open No. 2013-135270

SUMMARY

Problem to be Solved

Diversity is used mainly when a signal is received by a moving body. For example, in a situation in which a mobile terminal apparatus is carried and moved, a signal reception position is changed from moment to moment, so a reception sensitivity also tends to change. For example, a configuration is conceived in which one of a plurality of antennas is set as a main and the others are set as subs, and on the basis of a signal obtained with the main antenna, signals obtained with the sub antennas are processed. In this structure, if the reception sensitivity of the main antenna degrades, and a signal cannot be obtained, it may not be possible to process the signals obtained with the sub antennas.

Thus, in the case where the signals are received and processed with the plurality of antennas, if an antenna is incapable of obtaining a signal due to a reduction in the reception sensitivity, for example, there is a possibility that a normal process cannot be performed. Eliminating the possibility that the normal process cannot be performed and improving the performance of processing are being demanded.

The present disclosure has been made in view of the circumstances described above, and aims at making it possible to improve the performance when receiving signals via a plurality of antennas and performing processing therefor.

According to an embodiment of the present technology, there is provided a reception apparatus including: a plurality of demodulation units configured to demodulate a supplied branch and generate a symbol; and a synthesis unit configured to synthesize the symbol demodulated by the plurality of demodulation units, in which the synthesis unit sets a predetermined time from arrival time of a first-arriving symbol as a search range, and synthesizes a symbol that arrives within the search range and the first-arriving symbol.

The synthesis unit further includes a storage unit to store the first-arriving symbol, a synthesis processing unit to perform the synthesis, and a synchronization unit to monitor arrival of the symbol and control synchronization of the symbol, and the synchronization unit can cause the storage unit to store the first-arriving symbol therein, and when the symbol arrives within the search range, supply the symbol and the symbol stored in the storage unit to the synthesis processing unit with the symbols synchronized.

The storage unit can also store the symbol arrives within the search range, and the synchronization unit can synchronize and read the symbols stored in the storage unit at a time when the symbols from all of the plurality of demodulation units arrive and output the symbols to the synthesis processing unit.

When the symbol does not arrive within the search range, the synchronization unit can read the symbol stored in the storage unit and output the symbol to a subsequent stage without performing process by the synthesis unit.

The demodulation unit can perform demodulation by using OFDM (orthogonal frequency division multiplexing).

According to an embodiment of the present technology, there is provided a reception method for a reception apparatus including a plurality of demodulation units configured to demodulate a supplied branch and generate a symbol and a synthesis unit configured to synthesize the symbol demodulated by the plurality of demodulation units, the reception method including: setting a predetermined time from arrival time of a first-arriving symbol as a search range by the synthesis unit; and synthesizing a symbol that arrives within the search range and the first-arriving symbol by the synthesis unit.

According to an embodiment of the present technology, there is provided a program for causing a computer configured to control a reception apparatus including a plurality of demodulation units configured to demodulate a supplied branch and generate a symbol and a synthesis unit configured to synthesize the symbol demodulated by the plurality of demodulation units, to execute a process including the steps of setting a predetermined time from arrival time of a first-arriving symbol as a search range by the synthesis unit, and synthesizing a symbol that arrives within the search range and the first-arriving symbol by the synthesis unit.

In the reception apparatus, the reception method, and the program according to the embodiments of the present technology, the plurality of demodulation units that demodulates the supplied branch and generates the symbol is provided, and the symbol demodulated by the plurality of demodulation units is synthesized. Further, the predetermined time from the arrival time when the symbol arrives first is set as the search range, and the symbol that arrives within the search range and the first-arriving symbol are synthesized.

Effects

According to the embodiments of the present technology, it is possible to receive a signal via a plurality of antennas and improve performance in processing. It should be noted that the effects described herein are not limited, and any of the effects described in the present disclosure may be obtained.

MODE(S) FOR CARRYING OUT THE INVENTION

Hereinafter, modes for carrying out the present technology (hereinafter, referred to as embodiments) will be described. It should be noted that the description will be given in the following order.
1. About diversity
2. About structure of synthesis unit
3. About operation relating to reception of reception symbol by synthesis unit
4. About process by synthesis unit
5. About recording medium <About Diversity>

The present technology to be described hereinafter can be applied to a technology called diversity, so diversity is cited as an example and described. Existing technologies pursue improvement of quality and reliability of communication for signals that are identical to those received through a plurality of antennas, by primarily using signals received via an antenna having an optimal radio wave condition, by removing noise upon synthesizing the received signal, and the like. In the following description, the case where the same signals received via a plurality of antennas are synthesized will be described as an example.

Figure 1:
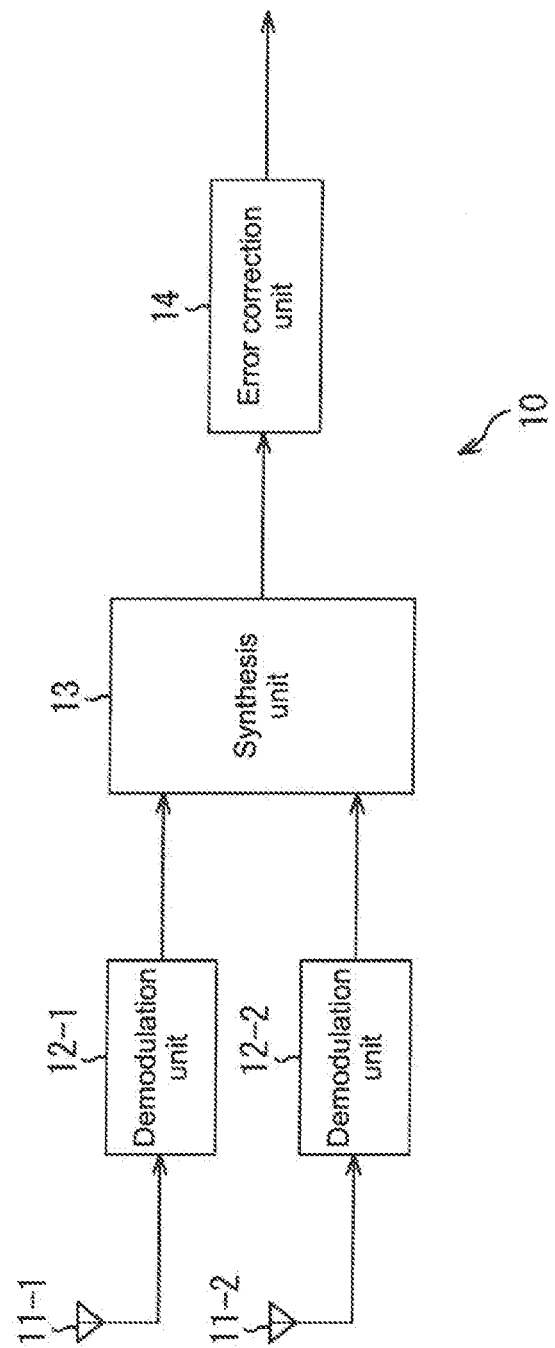
FIG. 1 A diagram showing the structure of an embodiment of a reception apparatus to which the present disclosure is applied.

FIG. 1 is a diagram showing the structure of a reception apparatus 10 to which the diversity technology is applied. The reception apparatus 10 is constituted of an antenna 11-1, an antenna 11-2, a demodulation unit 12-1, a demodulation unit 12-2, a synthesis unit 13, and an error correction unit 14. In this case, the description proceeds while citing the reception apparatus 10 provided with the two antenna 11-1 and antenna 11-2 as an example, but the present technology can be applied to a reception apparatus provided with two or more antennas.

In the case where there is no need to distinguish the antenna 11-1 and the antenna 11-2, the antennas are simply referred to as antenna 11. The other parts are also referred in a similar way.

A signal received via the antenna 11-1 is supplied to the demodulation unit 12-1, and a signal received via the antenna 11-2 is supplied to the demodulation unit 12-2. Hereinafter, for convenience, the signal received via the antenna 11 is referred to as branch.

The demodulation unit 12-1 and the demodulation unit 12-2 respectively demodulate branches supplied thereto. The demodulation unit 12 performs demodulation based on, for example, an orthogonal frequency division multiplexing (OFDM). Further, the demodulation unit 12 may be configured to perform demodulation of a broadcasting standard using the OFDM.

A demodulation result at a predetermined timing is referred to as reception symbol. A reception symbol from the demodulation unit 12-1 and a reception symbol from the demodulation unit 12-2 are supplied to the synthesis unit 13, respectively.

The synthesis unit 13 synthesizes the two reception symbols supplied, and supplies the synthesis result to the error correction unit 14. The output from the synthesis unit 13 is referred to as synthesis symbol. The error correction unit 14 performs error correction for the supplied synthesis symbol on the basis of a predetermined algorism and outputs a corrected symbol to a subsequent processing unit (not shown).

Figure 2:
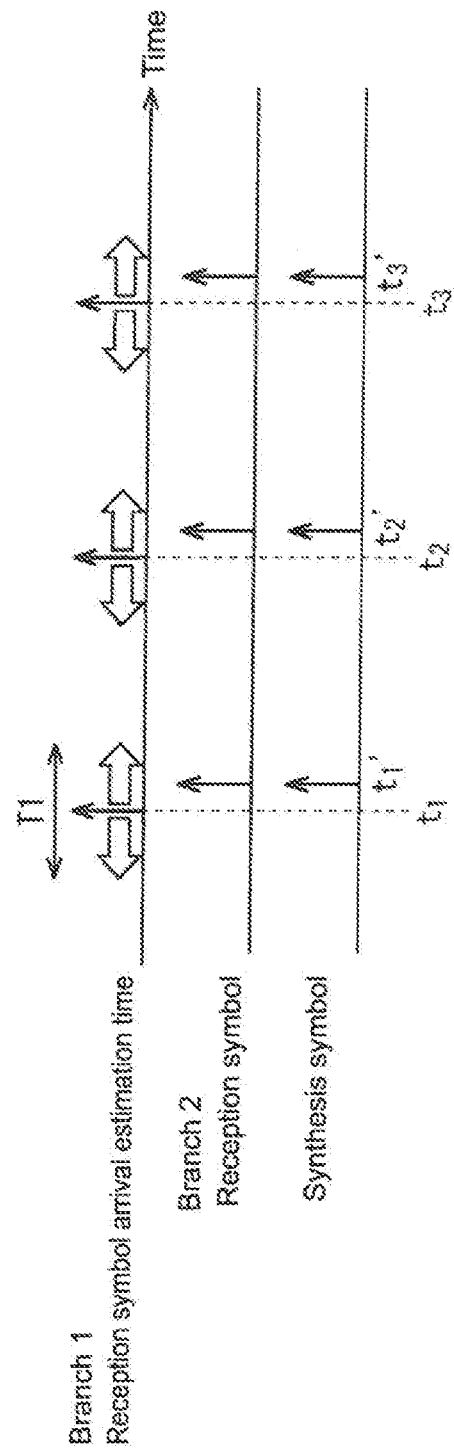
FIG. 2 A diagram for explaining timing when a reception symbol arrives.

With reference to FIG. 2, the synthesis operation in the synthesis unit 13 will be described. Here, a signal received via the antenna 11-1 is referred to as a branch 1, and a signal received via the antenna 11-2 is referred to as a branch 2. The branch 1 is set as main branch, and the branch 2 is set as a sub branch.

First, the case where the main branch and the sub branch are preset in this way will be described. A description will be given about that, in the case where the branches are preset, there is a possibility that the reception symbol cannot be obtained, for example, and performance as the reception apparatus may be degraded. Subsequently, a description will be further given about the structure and operation for decreasing the possibility that the situation as mentioned above occurs and improving the performance as the reception apparatus.

The upper stage shown in FIG. 2 shows estimated arrival time of the reception symbol of the branch 1, the middle stage shows arrival time of the reception symbol of the branch 2, and the lower stage shows output time of the synthesis symbol. In the figure, the horizontal axis represents time, and the positions where the upward arrows are located each represent the time when the symbol arrives. The estimated arrival time of the reception symbol of the branch 1 means the time when the reception symbol of the branch 1 arrives which is estimated by the synthesis unit 13, which shows a matching cycle.

A predetermined time around the estimated arrival time of the branch 1 (main branch) is set as a search range of the branch 2. On the upper stage shown in FIG. 2, the thick arrows directed in the horizontal direction indicate search ranges. For example, in the case where time t1 is the reception symbol estimated arrival time of the branch 1, predetermined times before and after the time t1 are set as the search range. Here, the time period corresponding to the search range is set as time period T1.

The reception symbol that is obtained within the search range is the reception symbol of the branch 2 and is a target to be synthesized by the synthesis unit 13. For example, when at the time t1, the reception symbol of the branch 1 is obtained, and at time t1' which is within the search range around the time t1, the reception symbol of the branch 2 is obtained, the two reception symbols are synthesized, thereby generating a synthesis symbol.

In this way, around the estimation arrival time of the main branch, the reception symbol from the other (sub branch) is observed, and the synthesis is performed. As shown in FIG. 2, when the reception symbol of the branch 1 and the reception symbol of the branch 2 are normally received, the synthesis symbol is generated and output. However, it can be expected that the reception symbol of either the main branch or the sub branch cannot be obtained.

Diversity is used when a signal is mainly received by a moving body. For example, in the case where a reception apparatus is carried and moved, a reception position of a signal constantly changes, so the reception sensitivity also tends to change. Therefore, it is expected that it may not be possible to obtain the reception symbol of the branch 1 or the reception symbol of the branch 2.

Figure 3:
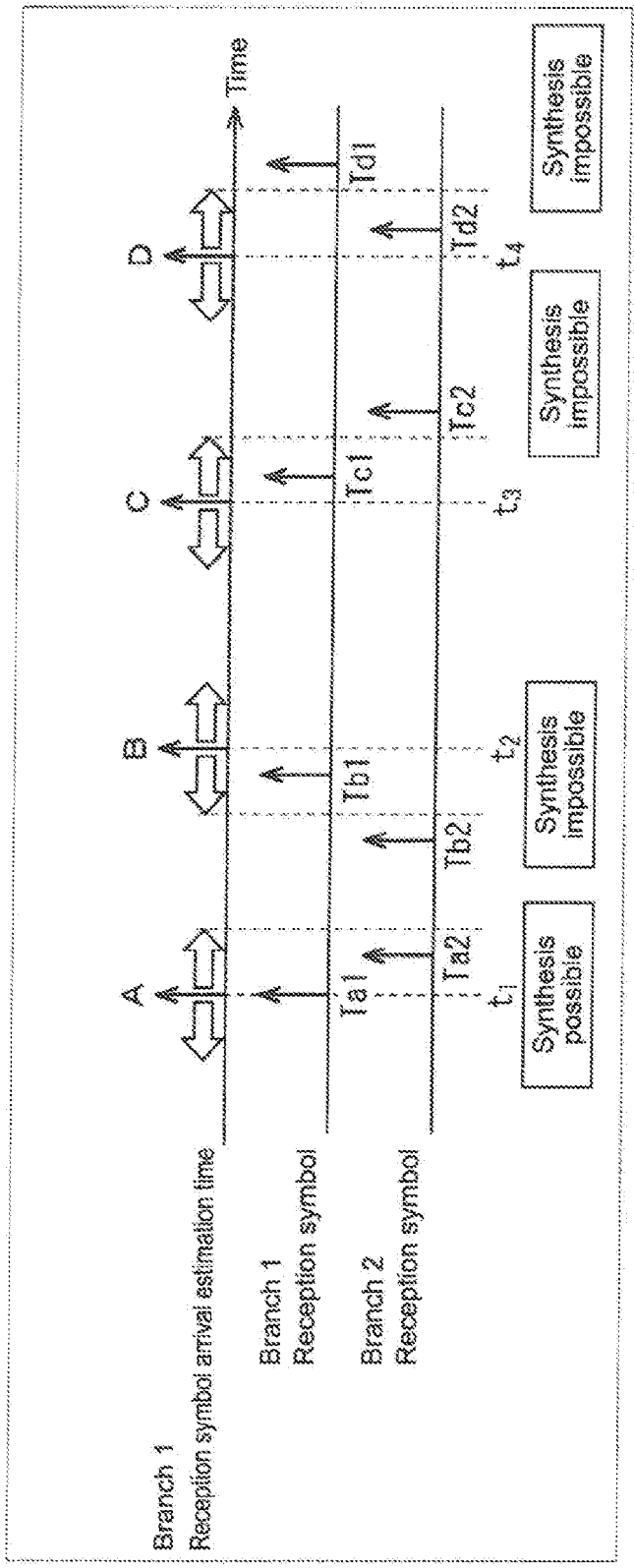
FIG. 3 A diagram for explaining timing when a reception symbol arrives.

This will be described with reference to FIG. 3. In FIG. 3, the upper stage shows the estimated arrival time and a search range of the reception symbol of the branch 1, the middle stage shows an arrival time of the reception symbol of the branch 1 that is actually received, and the lower stage shows an arrival time of the reception symbol of the branch 2 that is actually received.

A shown in FIG. 3 indicates the case in which the arrival time of the reception symbol of the branch 1 is time Ta1, which is substantially the same as the time t1 as the estimated arrival time, and the reception symbol of the branch 2 is obtained within the search range. In this case, the reception symbols of the branch 1 and the branch 2 can be obtained, so it is possible to synthesize the reception symbols and generate a synthesis symbol in the synthesis unit 13.

B shown in FIG. 3 will be referred to. The time when the reception symbol of the branch 1 arrives is time Tb1, which is a time slightly prior to the time t1 as the estimated arrival time, and the time is within the search range around the estimated arrival time. In this case, the reception symbol of the branch 1 is obtained within the search range. The reception symbol of the branch 2 arrives at time Tb2 outside the search range, and therefore cannot be obtained.

In this way, even in the case where the reception symbol of the branch 1 can be obtained within the search range, when the reception symbol of the branch 2 is outside the search range, the reception symbol of the branch 2 cannot be obtained. Therefore, it is not possible to perform synthesis in the synthesis unit 13. In this case, a diversity gain cannot be obtained.

C shown in FIG. 3 will be referred to. The state indicated by C shown in FIG. 3 is the same as the state indicated by B shown in FIG. 3, that is, the reception symbol of the branch 1 is obtained at time Tc1 within the search range, but the reception symbol of the branch 2 reaches time Tc2 outside the search range and therefore cannot be obtained. That is, the arrival time of the reception symbol of the branch 1 is the time Tc1, which is shortly after the time t1 as the estimated arrival time. However, the time is within the search range around the estimated arrival time, so the symbol is obtained.

However, the reception symbol of the branch 2 is not obtained because of being outside the search range, and the synthesis unit 13 cannot obtain and synthesize the two reception symbols. Thus, there is a possibility that the reception symbol of the branch 2 is outside the search range and cannot be obtained.

The state indicated by B and C shown in FIG. 3 is a state in which the reception symbol of the main branch can be obtained, but the reception symbol of the sub branch cannot be obtained. As indicated by D shown in FIG. 3, the main branch itself cannot be obtained.

With reference to D shown in FIG. 3, the time when the reception symbol of the branch 1 arrives is time Td1. When the time Td1 is outside the search range around the estimated arrival time, the reception symbol of the main branch cannot be obtained. If the arrival time of the reception symbol of the branch 2 is time Td2 within the search range, because the reception symbol of the branch 1 cannot be obtained, the reception symbols cannot be synthesized in the synthesis unit 13, and diversity gain cannot be obtained.

Further, in the case where the main branch cannot be obtained, the main branch is lost, with the result that a subsequent search of the branch or the like may be affected, and nothing is output to a subsequent processing unit (not shown), so any process cannot be performed by the subsequent processing unit.

In this way, even in the case where the structure is used in which the plurality of branches are obtained and synthesized, all of the plurality of branches cannot necessarily be obtained. If not obtained, there is a possibility that effects of the gain by diversity are not sufficiently obtained, and subsequent processes cannot be performed in a regular manner.

As means for preventing such a situation that the reception symbol cannot be obtained, it is conceivable that the search range from the estimated arrival time is expanded. However, expanding the search range requires a buffer having a considerably larger capacity to such an extent that the reception symbols which may be obtained within the search range are stored in the synthesis unit 13, which may increase cost.

Further, in the OFDM (orthogonal frequency division multiplexing), SFN (Single Frequency Network) may be implemented in which broadcasting is performed from a plurality of transmission stations at the same frequency in the same area. In this case, a large delay may be generated between signals from the plurality of transmission stations. Therefore, when a movement over broadcasting areas is carried out, for example, the arrival timing of the reception symbol may be significantly changed. If such a significant change in the arrival timing is caused, as described above, it may not be possible to obtain the reception symbol.

It is desirable that the occurrence of the situation is suppressed as much as possible in which the reception symbol cannot be obtained as described with reference to FIG. 3. In view of this, the structure of the synthesis unit 13 as shown in FIG. 4 is used, thereby suppressing the occurrence of the situation in which the reception symbol cannot be obtained, as much as possible.

<About Structure of Synthesis Unit>

Figure 4:
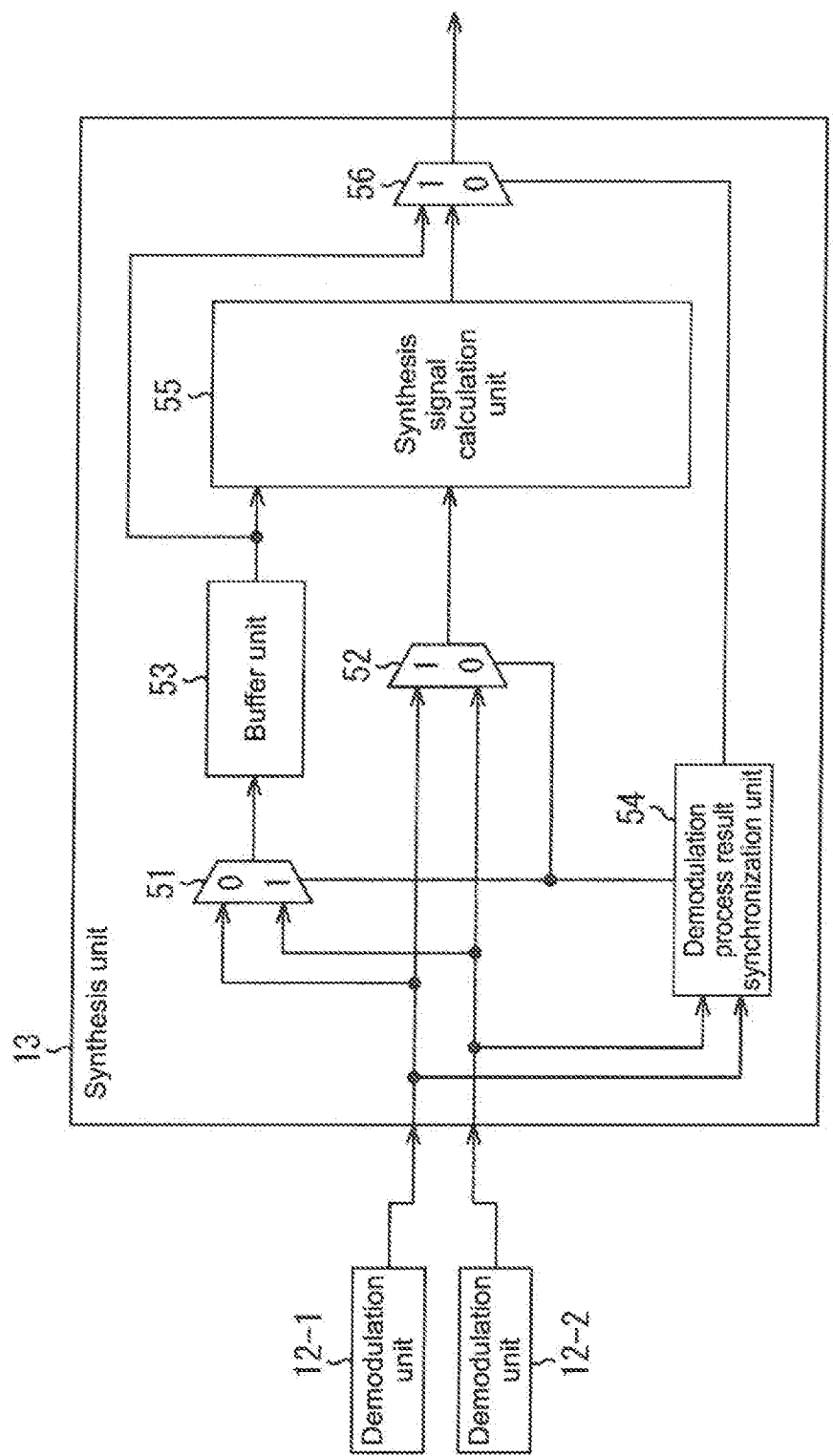
FIG. 4 A diagram showing an example of the internal structure of a synthesis unit.

FIG. 4 is a diagram showing the structure of an embodiment of the synthesis unit 13 to which the present technology is applied. The synthesis unit 13 shown in FIG. 4 includes a selector 51, a selector 52, a buffer unit 53, a demodulation process result synchronization unit 54, a synthesis signal calculation unit 55, and a selector 56.

On the basis of an instruction from the demodulation process result synchronization unit 54, the selector 51 outputs the reception symbol from the demodulation unit 12-1 or the demodulation unit 12-2 to the buffer unit 53. In the same way, on the basis of an instruction from the demodulation process result synchronization unit 54, the selector 52 outputs the reception symbol from the demodulation unit 12-1 or the demodulation unit 12-2 to the synthesis signal calculation unit.

The demodulation process result synchronization unit 54 sets a branch that arrives first as the main branch, and outputs a control signal to the selector 51 so as to output the reception symbol of the main branch to the buffer unit 53. Further, after setting the main branch, the demodulation process result synchronization unit 54 sets a predetermined time as the search range, and sets a branch of the reception symbol received within the search range as the sub branch. Then, the demodulation process result synchronization unit 54 outputs a control signal to the selector 52 so as to output the reception symbol of the sub branch to the synthesis signal calculation unit 55.

To the synthesis signal calculation unit 55, as described above, the reception symbol of the main branch and the reception symbol of the sub branch are supplied. To the synthesis signal calculation unit 55, at a time when the reception symbol of the sub branch arrives, the reception symbol of the main branch and the reception symbol of the sub branch are supplied. The synthesis signal calculation unit 55 respectively performs diversity synthesis for the reception symbol of the main branch and the reception symbol of the sub branch that are sent in synchronization and outputs the synthesized symbol to the selector 56.

On the basis of the instruction from the demodulation process result synchronization unit 54, the selector 56 outputs the symbol output from the buffer unit 53 or the synthesis signal calculation unit 55 to the error correction unit 14 (FIG. 1). Although details will be described later, in the case where the synthesis of the reception symbols is performed by the synthesis signal calculation unit 55, the selector 56 outputs the symbol from the synthesis signal calculation unit 55, and in the case where the synthesis of the reception symbols is not performed by the synthesis signal calculation unit 55, the selector 56 outputs the symbol from the buffer unit 53.

As described above, the synthesis unit 13 to which the present technology is applied sets the branch of the first-arriving symbol as the main branch and performs the process. That is, the synthesis unit 13 to which the present technology is applied performs the process while dynamically changing the main branch.

In this way, by dynamically changing the main branch, it is possible to obtain the reception symbols of the main branch and the sub branch, with the result that the gain of diversity can be obtained. This will be described with reference to FIG. 5.

<About Operation Relating to Reception of Reception Symbol by Synthesis Unit>

Figure 5:
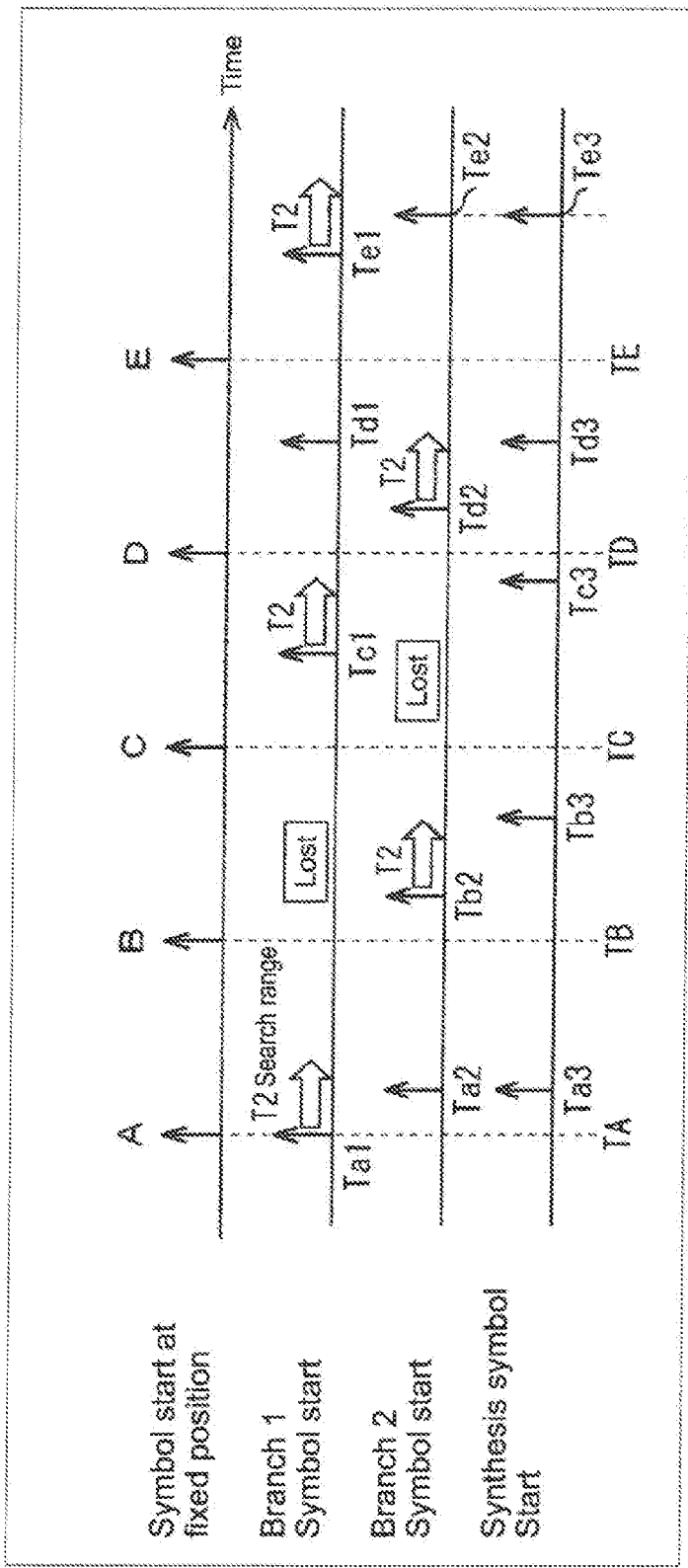
FIG. 5 A diagram for explaining timing when a reception symbol arrives.

The first stage shown in FIG. 5 indicates timings when the reception symbols arrive, for example, in the case where the reception apparatus 10 is located at a predetermined position and not moved from the position in a good reception state. As shown on the first stage, in the case where the reception state is not changed, the reception symbols are obtained at predetermined time intervals.

The second stage shown in FIG. 5 indicates timings when the reception symbols of the branch 1 are received, and the third stage indicates timings when the reception symbols of the branch 2 are received. The fourth stage shown in FIG. 5 indicates timings when the reception symbols are output from the synthesis unit 13.

In FIG. 5, the horizontal axis indicates time. Further, in FIG. 5, at time points when the reception symbols are received, the upward arrows are indicated. Furthermore, thick arrows in the horizontal direction indicate the search ranges.

In the state indicated by A shown in FIG. 5, as shown on the second stage, the reception symbol of the branch 1 arrives at the time Ta1, a time period T2 for which the time Ta1 is set as reference time (start time) is set as the search range. The time period of the search range is set to be a constant value as the time period T2, and the start time is the time when the reception symbol first arrives.

When the demodulation process result synchronization unit 54 (FIG. 4) obtains, at the time Ta1, branch 1, in this case, the reception symbol from the demodulation unit 12-1, the demodulation process result synchronization unit 54 sets the reception symbol from the demodulation unit 12-1 as the reception symbol from the main branch. Then, the demodulation process result synchronization unit 54 outputs, to the selector 51, a control signal to give an instruction to output the reception symbol from the demodulation unit 12-1 to the buffer unit 53. As a result, the reception symbol from the demodulation unit 12-1 is stored in the buffer unit 53.

After that, as indicated on the third stage of A shown in FIG. 5, when the reception symbol of the branch 2 arrives at time Ta2 within the search range (during time period T2), the demodulation process result synchronization unit 54 sets the reception symbol from the branch 2 as the reception symbol from the sub branch. Then, the demodulation process result synchronization unit 54 outputs, to the selector 52, a control signal to give an instruction to output the reception symbol from the demodulation unit 12-2 to the synthesis signal calculation unit 55.

In synchronization with the output of the reception symbol from the demodulation unit 12-2 to the synthesis signal calculation unit 55 through the selector 52, the reception symbol from the demodulation unit 12-1 stored in the buffer unit 53 is also output to the synthesis signal calculation unit 55. In this way, the reception symbol from the main branch and the reception symbol from the sub branch are supplied to the synthesis signal calculation unit 55 with the symbols synchronized, and synthesized.

B shown in FIG. 5 will be referred to. In the state indicated by B shown in FIG. 5, the reception symbol from the branch 1 (demodulation unit 12-1) cannot be obtained and is lost. At time Tb2, the reception symbol from the branch 2 (demodulation unit 12-2) is obtained. In this case, the time period T2 from the time Tb2 is set as the search range.

When the demodulation process result synchronization unit 54 receives the reception symbol from the demodulation unit 12-2 at the time Tb2, the demodulation process result synchronization unit 54 sets the reception symbol from the demodulation unit 12-2 as the reception symbol from the main branch. Then, the demodulation process result synchronization unit 54 outputs, to the selector 51, a control signal to give an instruction to output the reception symbol from the demodulation unit 12-2 to the buffer unit 53. As a result, the reception symbol from the demodulation unit 12-2 is stored in the buffer unit 53.

In the case where the reception symbol from the branch 1 (demodulation unit 12-1) is not obtained at a time point when the time period T2 elapses, as indicated by B shown in FIG. 5, at time Tb3, the reception symbol that has been obtained is read from the buffer unit 53 and output to the error correction unit 14.

After setting the main branch at the time Tb2, the demodulation process result synchronization unit 54 monitors whether the reception symbol from another branch arrives or not until the time period T2 elapses. During the monitoring, when the reception symbol can be obtained from another branch, the received reception symbol is set as the reception symbol of the sub branch, as described above with reference to A shown in FIG. 5. However, in the case where the time period T2 elapses without obtaining the reception symbol from another branch, the selector 56 is notified of the fact.

That is, in the case where the reception symbol from another branch cannot be searched out within the search range, for example, is lost as indicated by B shown in FIG. 5, the demodulation process result synchronization unit 54 outputs, to the selector 56, a control signal to give an instruction to output the reception symbol stored in the buffer unit 53 to the error correction unit 14 on a subsequent stage.

Through these process, the reception symbol of the main branch is output to the error correction unit 14. In this case, because the synthesis signal calculation unit 55 does not perform synthesis, diversity gain cannot be obtained. However, even in the situation in which one of the two reception symbols obtained from the two branches is lost, the other reception symbol can be reliably output to the error correction unit 14 subsequent thereto.

As described above with reference to FIG. 3, if the process is performed with the branch 1 (demodulation unit 12-1) set as the main branch, the state indicated by B shown in FIG. 5 is a state in which the reception symbol of the main branch is lost. In the case where the reception symbol of the main branch is lost, there is a possibility that the synthesis is not performed, and the reception symbol itself is not output to the subsequent processing unit (not shown).

However, according to the present technology, as described above with reference to B shown in FIG. 5, if the reception symbol is lost, the main branch is dynamically changed, and the start time point of the search range is changed. Therefore, it is possible to obtain and output at least one reception symbol.

C shown in FIG. 5 will be referred to. The state indicated by C shown in FIG. 5 is a state in which the reception symbol from the branch 1 (demodulation unit 12-2) cannot be obtained and is lost. At time Tc1, the reception symbol from the branch 1 (demodulation unit 12-1) is obtained. In this case, the time period T2 from the time Tc1 is set as the search range.

When receiving the reception symbol from the demodulation unit 12-1 at the time Tc1, the demodulation process result synchronization unit 54 sets the reception symbol from the demodulation unit 12-1 as the reception symbol from the main branch. Then, the demodulation process result synchronization unit 54 outputs, to the selector 51, a control signal to give an instruction to output the reception symbol from the demodulation unit 12-1 to the buffer unit 53. As a result, the reception symbol from the demodulation unit 12-1 is stored in the buffer unit 53.

When the reception symbol from the branch 2 (demodulation unit 12-2) is not obtained at a time point when the time period T2 elapses, as indicated by C shown in FIG. 5, at time Tc3, the reception symbol that has been obtained is output to the error correction unit 14.

After setting the main branch at the time Tc1, the demodulation process result synchronization unit 54 monitors the reception symbol from another branch until the time period T2 elapses. During the monitoring, when the reception symbol from another branch can be obtained, as described above with reference to A shown in FIG. 5, the received reception symbol is set as the reception symbol of the sub branch. However, in the case where the time period T2 elapses without obtaining the reception symbol from another branch, the selector 56 is notified of the fact.

That is, in the case where the reception symbol from another branch cannot be searched out within the search range, for example, as indicated by C shown in FIG. 5, the symbol is lost, the demodulation process result synchronization unit 54 outputs, to the selector 56, a control signal to give an instruction to output the reception symbol stored in the buffer unit 53 to the error correction unit 14 subsequent thereto.

Through the process, the reception symbol of the main branch is output to the error correction unit 14. In this case, because the synthesis is not performed by the synthesis signal calculation unit 55, diversity gain cannot be obtained. However, even in the situation in which one of the two reception symbols that are obtained from the two branches is lost, it is possible to reliably output another reception symbol to the error correction unit 14 subsequent thereto.

Thus, according to the present technology, as described above with reference to C shown in FIG. 5, even if the reception symbol is lost, the main branch is dynamically changed, and the start time point of the search range is changed. Therefore, it is possible to obtain and output at least one reception symbol.

Further, the description will be continued with reference to D shown in FIG. 5. The state indicated by D shown in FIG. 5 is a state in which the reception symbol from the branch 2 arrives prior to the reception symbol of the branch 1. At time Td2, the reception symbol of the branch 2 arrives. At time Td2, the demodulation process result synchronization unit 54 sets the reception symbol from the demodulation unit 12-2 as the reception symbol of the main branch, and controls the selector 51 so as to store the reception symbol from the demodulation unit 12-2 in the buffer unit 53.

The demodulation process result synchronization unit 54 starts to time the time period T2 from the time Td2, and starts to observe whether the reception symbol from another branch, in this case, the reception symbol from the demodulation unit 12-1 arrives or not.

At time Td1, when the reception symbol from the branch 1 (demodulation unit 12-1) arrives, the demodulation process result synchronization unit 54 gives the selector 52 an instruction to output the reception symbol from the demodulation unit 12-1 to the synthesis signal calculation unit 55. As a result, to the synthesis signal calculation unit 55, the reception symbols from the demodulation unit 12-1 and the demodulation unit 12-2 are supplied with the symbols synchronized. At time Td3, the synthesis signal calculation unit 55 synthesizes the two reception symbols and outputs the synthesized synthesis symbol to the selector 56.

The demodulation process result synchronization unit 54 gives the selector 56 an instruction to output the reception symbol from the synthesis signal calculation unit 55. By performing this process, at the time Td3, to the error correction unit 14, the reception symbol synthesized by the synthesis signal calculation unit 55 is output.

In this way, by dynamically performing changing so as to set one of the branch 1 and the branch 2 to the main branch, it is possible to perform the process with the branch at which the reception symbol first arrives as the main branch.

Further, it is only necessary to start the search range from the time when the reception symbol of the main branch arrives, and as described above, time around the estimated arrival time does not have to be included in the search time period. For example, as described above with reference to FIG. 2, in the case where the time period of the search range is set as the time period T1, which is the search range around the estimated arrival time, the former half of the time period T1 before the estimated arrival time and the latter half of the time period T1 after the estimated arrival time are set as the search range.

In contrast, in the case described with reference to FIG. 5, it is only necessary to set only the time period T2 after the time when the reception symbol from the branch set as the main branch arrives is set as the search range. The time period T2 can be half of the time period T1, for example. If the time period T2=½ of the time period T1 is set, this is a short time period as the search range, but during the ½ of the time period T1 after the main branch, the search is carried out, so the accuracy is not lowered.

Further, it is also possible to set the time period T2=the time period T1. In this case, the time period from the time when the reception symbol from the branch set as the main branch arrives is the search range, so the search range of this time period is a double range as compared to the case described with reference to FIG. 2. Therefore, it is possible to further improve the search capability. Even in the case where the arrival time of the sub branch is significantly delayed from the arrival of the main branch, it is possible to increase the possibility that the reception symbol of the sub branch can be obtained.

Further, as indicated by E shown in FIG. 5, even in the case where the reception symbols of the main branch and the sub branch arrive with considerable delay, the present technology can be applied thereto. That is, when the demodulation process result synchronization unit 54 obtains the reception symbol from the branch 1, in this case, the demodulation unit 12-1 at time Te1, the demodulation process result synchronization unit 54 sets the reception symbol from the demodulation unit 12-1 as the reception symbol from the main branch.

The reception symbol of the main branch arrives at the time Te1, which is significantly delayed from time TE when the reception symbol is scheduled to arrive. However, the first-arriving branch is set as the main branch, and after the main branch is set, the search range is set, so even if the reception symbol from the branch as the main branch is significantly delayed, it is possible to obtain the reception symbol of the main branch.

If the time TE is set as the estimated arrival time, and a time period therearound is set as the search range, in the case where the arrival of the reception symbol is significantly delayed, the search range is exceeded, so the reception symbol cannot be obtained. However, as described above with reference to E shown in FIG. 5, according to the present technology, even if the arrival of the reception symbol is significantly delayed, it is possible to obtain the reception symbol.

At the time Te1, the reception symbol from the branch 1 is received. After that, at time Te2, when the reception symbol of the branch 2 arrives within the search range (during time period T2), the demodulation process result synchronization unit 54 sets the reception symbol from the branch 2 as the reception symbol from the sub branch. Then, the demodulation process result synchronization unit 54 outputs, to the selector 52, a control signal to give an instruction to output the reception symbol from the demodulation unit 12-2 to the synthesis signal calculation unit 55.

At the timing when the reception symbol from the demodulation unit 12-2 is output to the synthesis signal calculation unit 55 through the selector 52, the reception symbol from the demodulation unit 12-1 which is stored in the buffer unit 53 is also output to the synthesis signal calculation unit 55. In this way, the reception symbol from the main branch and the reception symbol from the sub branch are supplied to the synthesis signal calculation unit 55 with the reception symbols synchronized and are synthesized.

As described above, according to the present technology, it is possible to obtain even the significantly delayed reception symbol.

<About Process of Synthesis Unit>

A description will be given again with reference to the flowchart of FIG. 6 on the operation relating to the reception of the reception symbol by the synthesis unit described with reference to FIG. 5.

In Step S11, the demodulation process result synchronization unit 54 monitors whether the reception symbol is output from the demodulation unit 12-1 or the demodulation unit 12-2 or not, and determines whether the reception symbol arrives or not.

Monitoring is continued until it is determined that the reception symbol has arrived. Then, in Step S12, when it is determined that the reception symbol arrives, the process proceeds to Step S12.

In Step S12, the branch (demodulation unit 12) on the side at which the reception symbol arrives is set as the main branch. Then, in Step S13, a control signal is output to the selector 51 to supply the reception symbol on the side set as the main branch to the buffer unit 53 and store the reception symbol therein.

In Step S14, the demodulation process result synchronization unit 54 starts to time the search range (time period T2).

In Step S15, it is determined whether the reception symbol arrives or not. The determination in Step S15 is determination whether the reception symbol from the sub branch arrives or not. In Step S15, in the case where it is determined that the reception symbol arrives, the process proceeds to Step S16.

In Step S16, the branch on the side at which the reception symbol arrives is set as the sub branch. Then, in Step S17, a control signal is output to the selector 52 to output the reception symbol on the side set as the sub branch to the synthesis signal calculation unit 55.

In Step S18, an instruction is given so as to output the reception symbol stored in the buffer unit 53 to the synthesis signal calculation unit 55. In this way, in the case where the two reception symbols are supplied to the synthesis signal calculation unit 55, in Step S19, the synthesis signal calculation unit 55 synthesizes the two reception symbols.

Then, in Step S20, an instruction is given to the selector 56 to output the synthesis symbol obtained by synthesis by the synthesis signal calculation unit 55 to the error correction unit 14 subsequent thereto.

On the other hand, in Step S15, in the case where it is determined that the reception symbol does not arrive yet, the process proceeds to Step S21. In Step S21, the demodulation process result synchronization unit 54 determines whether the time period T2 elapses or not, in other words, whether the search is performed within the search range or not.

In Step S21, in the case where it is determined that the time period T2 does not elapse, in other words, within the search range, the process returns to Step S15, and the subsequent process is repeatedly performed. On the other hand, in Step S21, it is determined that the time period T2 elapses, in other words, outside the search range, the process proceeds to Step S22.

In Step S22, an instruction is given to the selector 56 to output the reception symbol stored in the buffer unit 53 to the error correction unit 14 subsequent thereto. In this way, even in the case where only the reception symbol from the main branch cannot be obtained, the control is performed so as to reliably supply the reception symbol to the subsequent process.

As described above, according to the present technology, the main branch is set for each reception symbol, and the search range of the branch is dynamically changed, with the result that it is possible to obtain diversity gain as long as the delay between the plurality of branches is within the search range.

Further, even if the timing of a branch is deviated out of the search range, the search is started around the branch, so losing the branch is avoided. It is possible to limit the search range to a relative delay difference between the multiple branches, so it is possible to suppress a required capacity of the buffer.

It should be noted that in the above embodiment, the description is given while citing an example of the reception apparatus 10 having the two branches, but to the reception apparatus 10 having two or more branches, the present technology can also be applied.

Figure 6:
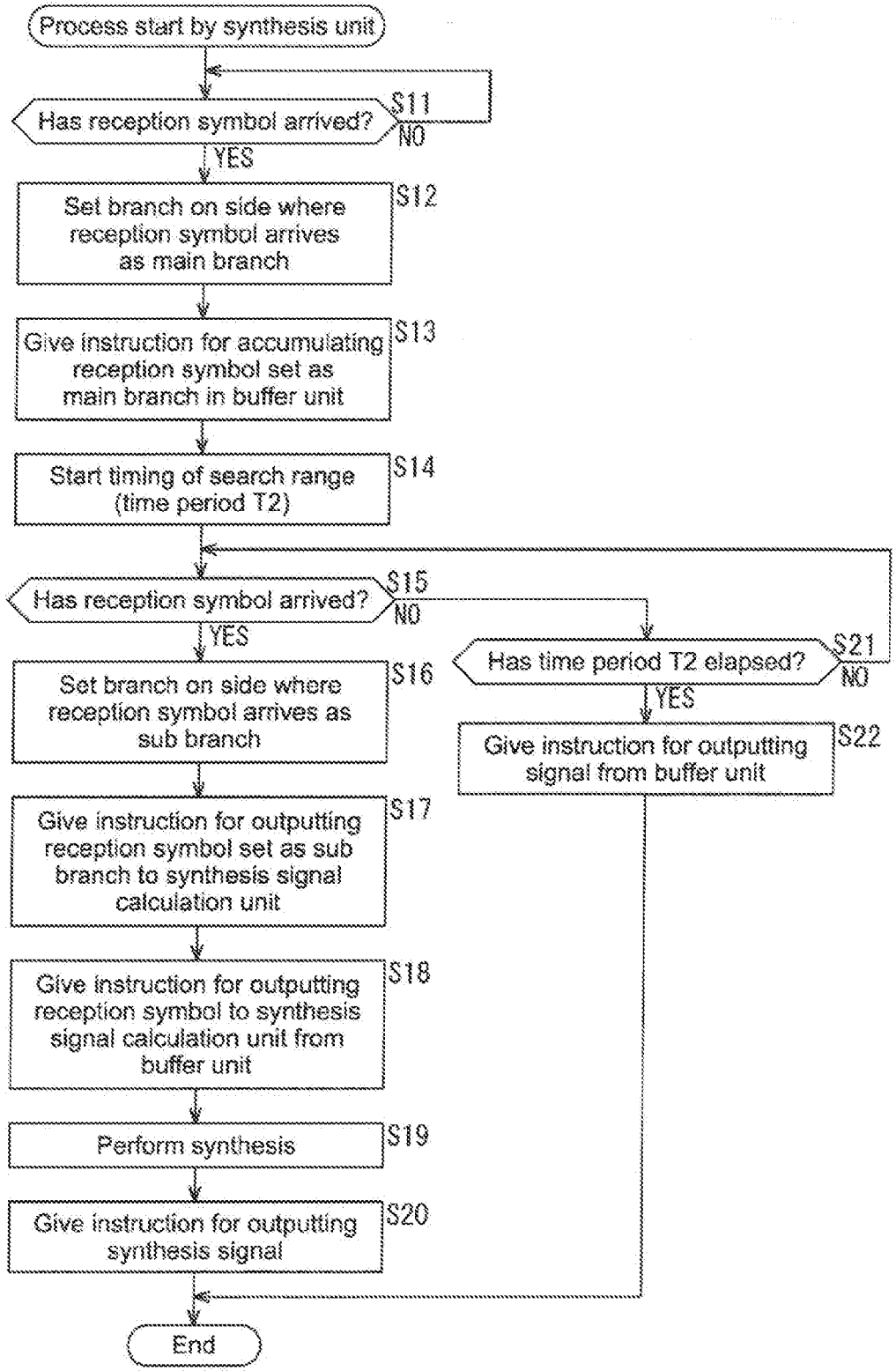
FIG. 6 A flowchart for explaining a process by the synthesis unit.

In the case of a reception apparatus having two or more branches, for example, in the process of the flowchart shown in FIG. 6, the process of Steps S15 to S17, that is, the process of receiving the reception symbol of the sub branch is repeatedly performed multiple times, thereby making it possible to perform the process for dealing with the plurality of branches.

In the case where there is a plurality of branches, the synthesis unit 13 is configured to include buffer units, the number of which is smaller than the number of the branches by 1, thereby making it possible to perform the process for dealing with the plurality of branches. Then, the reception symbol from the sub branch is accumulated in the buffer units successively in the order of arrival. At a time when the reception symbol from the last branch arrives, the reception symbol and the reception symbols from all the buffer units are supplied to the synthesis signal calculation unit 55 and synthesized.

Further, in the case where the search range is exceeded, the reception symbols accumulated in the buffer units at this time are synthesized. If the reception symbols are accumulated only in one buffer unit, the synthesis process is omitted, and the reception symbols from the buffer unit are set to be output to the error correction unit 14 subsequent thereto.

With this structure, the process is performed, with the result that the present technology can also be applied to the reception apparatus provided with a plurality of branches.

<About Recording Medium>

The series of processes described above can be performed by hardware or software. When the series of processes are performed by software, programs that configure the software are installed into a computer. Here, the computer includes a computer incorporated in dedicated hardware, for example, a general-purpose personal computer capable of implementing various functions by installing various programs, and the like.

Figure 7:
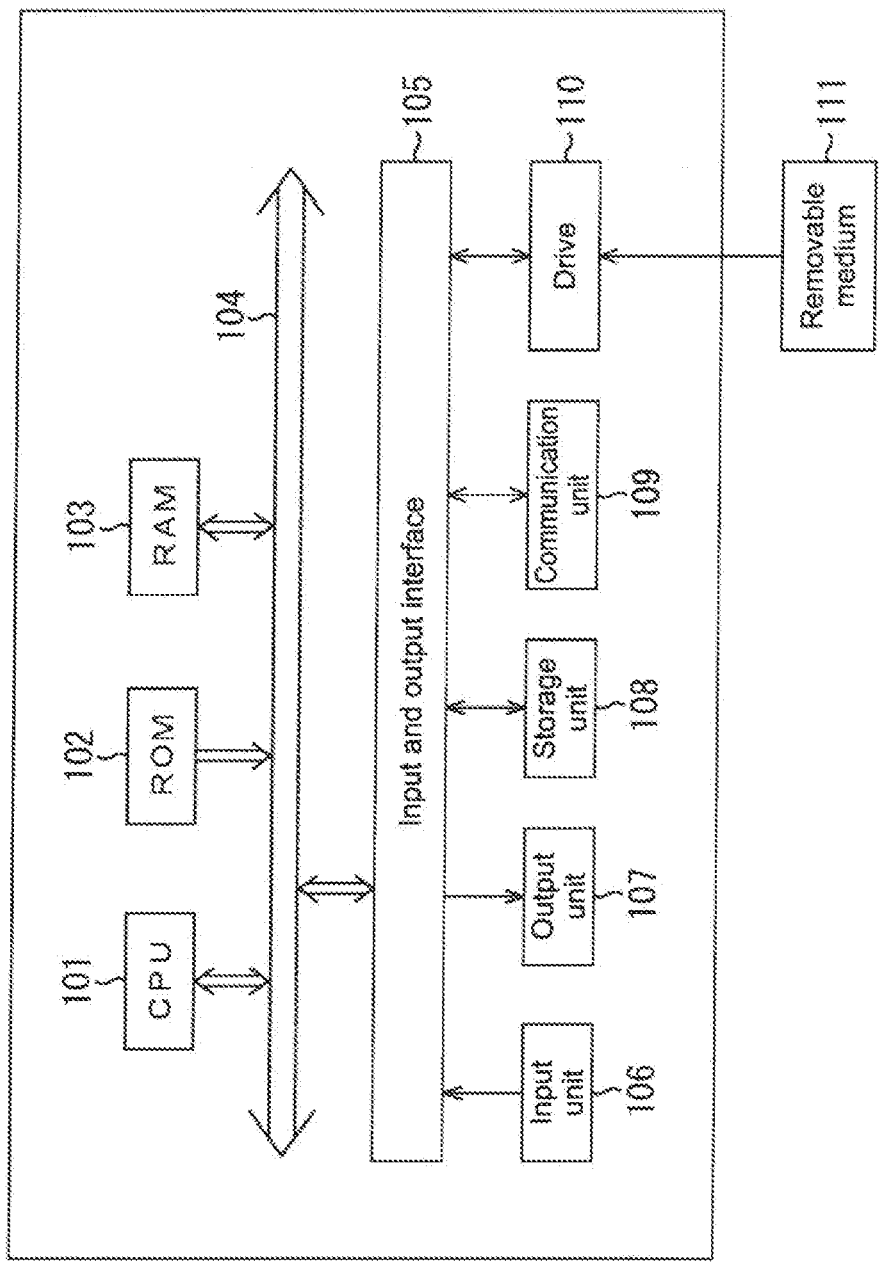
FIG. 7 A diagram for explaining a recording medium.

FIG. 7 is a block diagram showing an example of the structure of hardware of a computer which executes the series of processes described above by a program. In the computer, a CPU (Central Processing Unit) 101, a ROM (Read Only Memory) 102, and a RAM (Random Access Memory) 103 are connected with one another via a bus 104. To the bus 104, an input and output interface 105 is further connected. To the input and output interface 105, an input unit 106, an output unit 107, a storage unit 108, a communication unit 109, and a drive 110 are connected.

The input unit 106 may include a keyboard, a mouse, a microphone, or the like. The output unit 107 may include a display, a speaker, or the like. The storage unit 108 may include a hard disk, a nonvolatile memory, or the like. The communication unit 109 may include a network interface or the like. The drive 110 drives a removable medium 111 such as a magnetic disk, an optical disk, a magneto-optical disk, and a semiconductor memory.

In the computer configured as described above, the CPU 101 loads a program stored in the storage unit 108 via the input and output interface 105 and the bus 104 into the RAM 103, for example, and executes the program, thereby performing the series of processes described above.

The program executed by the computer (CPU 101) can be recorded in the removable medium 111 and provided, for example as a package medium or the like. Further, the program can be provided via a wired or wireless transmission medium such as a local area network, the Internet, and digital satellite broadcasting.

In the computer, the program can be installed into the storage unit 108 via the input and output interface 105 by loading the removable medium 111 to the drive 110. Further, the program can be received by the communication unit 109 via a wired or wireless transmission medium and installed into the storage unit 108. In addition, the program can be installed in advance into the ROM 102 or the storage unit 108.

It should be noted that the processes of the program executed by the computer may be performed on a time-series basis in the order described in the specification, or may be performed in parallel or at necessary timings, for example, at a timing when being called.

Further, in the specification, system refers to an entire apparatus constituted of a plurality of apparatuses.

It should be noted that the effects described in the specification are merely examples and not limited thereto, and other effects may be provided.

It should be noted that the embodiment of the present technology is not limited to the above embodiments and can be variously changed without departing from the gist of the present technology.

It should be noted that the present technology can take the following configurations.

(1) A reception apparatus, including:
 a plurality of demodulation units configured to demodulate a supplied branch and generate a symbol; and
 a synthesis unit configured to synthesize the symbol demodulated by the plurality of demodulation units, in which
 the synthesis unit sets a predetermined time from arrival time of a first-arriving symbol as a search range, and synthesizes a symbol that arrives within the search range and the first-arriving symbol.

(2) The reception apparatus according to (1) above, in which
 the synthesis unit further includes
 a storage unit configured to store the first-arriving symbol,
 a synthesis processing unit configured to perform the synthesis, and
 a synchronization unit configured to monitor arrival of the symbol and control synchronization of the symbol, and
 the synchronization unit causes the storage unit to store the first-arriving symbol therein, and when the symbol arrives within the search range, supplies the symbol and the symbol stored in the storage unit to the synthesis processing unit with the symbols synchronized.

(3) The reception apparatus according to (2) above, in which
 the storage unit also stores the symbol that arrives within the search range, and
 the synchronization unit synchronizes and reads the symbols stored in the storage unit at a time when the symbols from all of the plurality of demodulation units arrive and outputs the symbols to the synthesis processing unit.

(4) The reception apparatus according to (2) or (3) above, in which
 when the symbol does not arrive within the search range, the synchronization unit reads the symbol stored in the storage unit, and outputs the symbol to a subsequent stage without performing process by the synthesis unit.

(5) The reception apparatus according to any one of (1) to (4) above, in which the demodulation unit performs demodulation by using OFDM (orthogonal frequency division multiplexing).

(6) A reception method for a reception apparatus including
a plurality of demodulation units configured to demodulate a supplied branch and generate a symbol, and
a synthesis unit configured to synthesize the symbol demodulated by the plurality of demodulation units, the reception method including:
setting a predetermined time from arrival time of a first-arriving symbol as a search range by the synthesis unit; and
synthesizing a symbol that arrives within the search range and the first-arriving symbol by the synthesis unit.

(1) A program for causing a computer configured to control a reception apparatus including
a plurality of demodulation units configured to demodulate a supplied branch and generate a symbol, and
a synthesis unit configured to synthesize the symbol demodulated by the plurality of demodulation units,
to execute a process including the steps of
setting a predetermined time from arrival time of a first-arriving symbol as a search range by the synthesis unit, and
synthesizing a symbol that arrives within the search range and the first-arriving symbol by the synthesis unit.

DESCRIPTION OF REFERENCE NUMERALS 10 reception apparatus
11 antenna
12 demodulation unit
13 synthesis unit
14 error correction unit
51, 52 selector
53 buffer unit
54 demodulation process result synchronization unit
55 synthesis signal calculation unit
56 selector

The invention claimed is:

1. A reception apparatus, comprising:
circuitry configured to:
demodulate a first branch to generate a first symbol;
demodulate a second branch to generate a second symbol;
set a time interval from an arrival time of the first symbol as a search range; and
synthesize the first symbol and the second symbol based on an arrival of the second symbol within the search range, wherein the first symbol and the second symbol are synthesized to generate a synthesis symbol.

2. The reception apparatus according to claim 1, wherein the circuitry is further configured to:
store the first symbol,
monitor the arrival of the second symbol and control synchronization of the second symbol, and
synthesize the second symbol and the stored first symbol based on the arrival of the second symbol within the search range.

3. The reception apparatus according to claim 2, wherein the circuitry is further configured to:
store the second symbol based on a lost first signal, and
read the stored first symbol and the stored second symbol based on arrival of a third symbol of a plurality of symbols, and
output the third symbol of the plurality of symbols for synthesis.

4. The reception apparatus according to claim 1, wherein the circuitry is further configured to demodulate the first branch and the second branch based on orthogonal frequency division multiplexing (OFDM).

5. A reception method, comprising:
in a reception apparatus:
demodulating, by a circuitry, a first branch to generate a first symbol;
demodulating, by the circuitry, a second branch to generate a second symbol;
setting, by the circuitry, a time interval from an arrival time of the first symbol as a search range; and
synthesizing, by the circuitry, the first symbol and the second symbol based on an arrival of the second symbol within the search range, wherein the first symbol and the second symbol are synthesized to generate a synthesis symbol.

6. A non-transitory computer-readable medium having stored thereon, computer-executable instructions, which when executed by a computer, cause the computer to execute operations, the operations comprising:
demodulating a first branch to generate a first symbol;
demodulating a second branch to generate a second symbol;
setting a time interval from an arrival time of the first symbol as a search range; and
synthesizing the first symbol and the second symbol based on an arrival of the second symbol within the search range, wherein the first symbol and the second symbol are synthesized to generate a synthesis symbol.

* * * * *